United States Patent [19]

Nishiyama et al.

[11] Patent Number: 5,568,640
[45] Date of Patent: Oct. 22, 1996

[54] DOCUMENT RETRIEVING METHOD IN A DOCUMENT MANAGING SYSTEM

[75] Inventors: Tatsuya Nishiyama, Hirakata; Satoshi Wakayama, Sakai; Yoshiki Matsuda, Kawasaki; Tetsuya Hashimoto, Yokohama; Keiji Kojima, Sagamihara; Kiyoshi Yamamoto, Osaka, all of Japan

[73] Assignees: Hitachi, Ltd., Tokyo; Hitachi Seibu Software Co., Ltd., Osaka, both of Japan

[21] Appl. No.: 309,416

[22] Filed: Sep. 20, 1994

[30] Foreign Application Priority Data

Sep. 20, 1993 [JP] Japan .................................. 5-232852

[51] Int. Cl.$^6$ .................................................. G06F 17/30
[52] U.S. Cl. ................. 395/600; 364/419.19; 364/225.4; 364/252.3; 364/254; 364/282.1; 364/DIG. 1
[58] Field of Search .......................... 395/600; 364/419

[56] References Cited

U.S. PATENT DOCUMENTS

| | | | |
|---|---|---|---|
| 4,823,306 | 4/1989 | Barbic et al. | 395/600 |
| 4,868,733 | 9/1989 | Fujisawa et al. | 395/600 |
| 4,868,743 | 9/1989 | Nishio | 395/600 |
| 5,317,507 | 4/1994 | Gallant | 364/419.13 |
| 5,418,946 | 5/1995 | Mori | 395/600 |
| 5,418,948 | 5/1995 | Turtle | 395/600 |
| 5,442,778 | 8/1995 | Pedersen et al. | 395/600 |

*Primary Examiner*—Thomas G. Black
*Assistant Examiner*—Peter Y. Wang
*Attorney, Agent, or Firm*—Antonelli, Terry, Stout & Kraus

[57] ABSTRACT

A document retrieving method in a document management system which manages documents, using a computer. The classification of documents is managed in accordance with a plurality of node trees constructed in a hierarchical structure. Each document is related to at least one node among a plurality of nodes in the node trees. In retrieval, an OR merge operation is performed on documents related to all the nodes ranging from the target node and extending through all lower nodes linked directly and indirectly to the target mode of a designated node tree to form a collection of documents. When a different node tree is designated, a similar OR operation is performed on documents related to all the nodes ranging from the target node to lower nodes linked directly and indirectly to the target node to create another collection of documents. These steps are repeated and an AND-marge operation is performed on the obtained collections of documents to create and output a final collection of documents.

4 Claims, 19 Drawing Sheets

FIG. 9

```
┌─────────────────────────────────────────────┐
│              DOCUMENT LIST                  │  ~1201
├─────────────────────────────────────────────┤
│   FILE (F)    AP START-UP (A)  RETRIEVAL (S)│
├─────────────────────────────────────────────┤
│  NAME   OWNER   UPDATING DATE    SIZE       │  1202
│  DOC.1  nishi   93/05/09  9:00   3200       │
│  DOC.2  nishi   93/05/10 14:10   1515       │
│  DOC.4  tatsu   93/05/12 15:30    968       │
│              1203                           │
│   1205       1204                           │
│                                             │
└─────────────────────────────────────────────┘
```

FIG. 10

```
┌─────────────────────────────────────────────┐
│                  BROWSER                    │
├─────────────────────────────────────────────┤
│   FILE (F)                                  │
├─────────────────────────────────────────────┤
│                      LOGICAL        1004    │
│  VIEW [ COMPANY ↕]   OPERATION [AND  ↕]     │
│                      MODE                   │
│  ┌───────────────────────────────┐          │
│  │   VIEW "COMPANY"              │          │
│  │                               │  1001    │
│  │  COMPANY                      │          │
│  │   ├─ CO.A                     │          │
│  │   ├─ CO.B      1002           │          │
│  │   │   ├─ SEC.B1               │          │
│  │   │   │   ├─ ▓1ST G▓          │          │
│  │   │   │   └─ ▓2ND G▓          │          │
│  │   │   └─ SEC.B2               │          │
│  │   └─ CO.C      1003           │          │
│  └───────────────────────────────┘          │
└─────────────────────────────────────────────┘
```

FIG. 11

| DOCUMENT LIST | | | |
|---|---|---|---|
| FILE (F)    AP START-UP (A)    RETRIEVAL (S) | | | |
| NAME 〈1401 OWNER | UPDATING DATE | SIZE | |
| DOC.2— nishi | 93/05/10 14:10 | 1515 | |
|         └1402 | | | |

FIG. 12

| DOCUMENT LIST | | | |
|---|---|---|---|
| FILE (F)    AP START-UP (A)    RETRIEVAL (S) | | | |
| NAME 〈1501 OWNER | UPDATING DATE | SIZE | |
| DOC.1— nishi | 93/05/09  9:00 | 3200 | |
| DOC.2— nishi | 93/05/10 14:10 | 1515 | |
| DOC.3— yama | 93/05/10  8:30 | 565 | |
| DOC.4— tatsu | 93/05/12 15:30 | 968 | |
| 1505   └1502 | | | |
|      └1503 | | | |
|   1504 | | | |

FIG. 19

| DOCUMENT SIGHT PICTURE |||
|---|---|---|
| FILE | AP START-UP (A) | RETRIEVAL (S) |
| HISTRY: 1ST G-AP |||

```
   ,2701
NAME  OWNER     UPDATING DATE     SIZE
DOC 4─ tatsu    93/05/12  15:30   968
       │
       └─2702
```

FIG. 20

| DOCUMENT SIGHT PICTURE |||
|---|---|---|
| FILE (F) | AP START-UP (A) | RETRIEVAL (S) |
|  | ─2804 | ─2805 |
| HISTRY: 1ST G-AP |||

```
   ,2801
NAME  OWNER     UPDATING DATE     SIZE
DOC 2─ nishi    93/05/10  14:10   1515
DOC 4  tatsu    93/05/12  15:30   968
 )
2803
       └─2802
```

DOCUMENT RETRIEVING METHOD IN A DOCUMENT MANAGING SYSTEM

BACKGROUND OF THE INVENTION

The present invention relates to document managing systems which manage documents, using a computer, and more particularly to a document retrieving method in a document managing system which manages and classifies a document managed by a computer, irrespective of a managing system for a file system of a computer.

At present, we use application programs such as word processor software and spreadsheet software on personal computers and work stations to create and manage documents.

Conventionally, those computers use a file system which is a subsystem of an operating system (OS) to manage documents in the form of a data file on the file system. For example, in a Microsoft Windows Operating System (trademark) sold by Microsoft Corporation, documents are managed hierarchically by a control file called a directory on a hierarchical file system which manages data files hierarchically. At this time, when a document is composed of a plurality of data files, like a text data file and a format data file, the form of the name of a file (the name of the file is used as the base name of the data file and an extension is attached to each of kinds of data files) and the name of the directory are caused to correspond to the name of the document in order to cause the document and the data files to correspond to each other to store those data files in that directory.

In order to cause a document and an application program to correspond to each other, there is, for example, a file manager, which is a program to manage a file system, in Microsoft Windows. The file manager has the function of causing an application program and a document to correspond to each other, using an extension of the name of the data file. When the data file is instructed to start up an application program, a corresponding application program is searched for on the basis of the extension of the data file and the data file is started up as data.

As another technique, Macintosh (trademark) sold by Apple Computer, Inc. stores information on an application program in each data file.

In order to classify and browse for documents, there is a technique which classifies documents in accordance with a directory, using a hierarchical file system. For example, a directory is named in correspondence to a classification, and a directory and a data file are constructed in the form of a tree structure in a hierarchical manner such that the user can fabricate a classification system freely and browse for stored documents by tracing the directory. At this time, in order to classify a document from different hierarchical directories, the Macintosh system uses the function of an alias of a file to put a special control file which refers to another data file in a directory of a different hierarchy to thereby create a plurality of classifications.

SUMMARY OF THE INVENTION

In the conventional techniques, an OS file system is used to manage documents, so that satisfactory management of documents cannot be sometimes achieved due to restrictions on the OS.

First, when documents each are composed of a plurality of data files, causing documents and data files to correspond to each other is required for the user to manage by himself, using the names of the respective files. When documents are handled in a lump, the user can often forget to copy a part of a data file when he desires to copy the document. The names of the data files are used and information is stored in the respective data files to cause an application program and a document to correspond to each other. Therefore, when a corresponding application program is to be changed, the names of the data files are required to be changed and data files are required to be re-created.

Second, since a hierarchical directory of a file system is used to classify documents, the name of a document is sometimes restricted by the file system, and when the hierarchy of the classification is deepened, the processing performance can sometimes be deteriorated. When classification is desired to have special information, and, for example, when the creator of a document creates a classification, the name of the creator is required to correspond to a directory, and other information such as the creator's address is required to be stored in a data file newly created separately from the control file of the directory.

Third, since a hierarchy of document classification is created in a system of directory hierarchy in the file system, the respective classifications are traceable to browse a document, but browsing a document in a combination of classifications has not been considered.

The present invention is made in view of the above situations.

It is a first object of the present invention to provide a document managing method which facilitates causing documents to correspond to data files and/or application programs.

It is a second object of the present invention to provide a document managing method in which the classification of documents is free from the restrictions of the file system.

It is a third object of the present invention to provide a document managing method in which a document is easily browsed on the basis of a combination of classifications.

The first object is achieved as follows: In order to manage documents, information nodes corresponding to the kind of documents are provided. The documents are caused to belong to the information nodes corresponding to the kinds of-the documents. The information node stores information on the structure of the data files of the document belonging to the node and information on the corresponding application program. Concerning documents, items of document information are provided which is the data file names which constitute a part of each document, and which is data to store the address of the document. Those pieces of document information are linked from the information node which expresses the kind of the document.

The second object is achieved as follows: Irrespective of the directory hierarchy, information nodes are constituted in a hierarchical manner. Each information node stores a collection of information subnodes and a collection of document information. The information node is adapted for the user to store any information therein.

The third object is achieved as follows: A plurality of information node hierarchies is provided. When a document is browsed, AND/OR merge operations are performed on the collection of document information which belongs to that information node.

Since an information node corresponding to a document stores information on the structure of the document and on an application program, both processing of a plurality of data files in a lump and cooperation with the application program are performed by reference to that information node to which the document belongs. Even when the structure of a data file and an application program are changed, information corresponding to one information node is only required to be changed and no respective documents are required to be changed.

The information node stores information on the collection of information subnodes and information on the collection of documents, so that classification is capable of being constructed, irrespective of the restriction on the hierarchial directory. The user is capable of setting any information in the information node, so that he is capable of storing information concerned, irrespective of the classification name.

Since documents are capable of being managed in a plurality of classifications in accordance with a plurality of hierarchies of information nodes, a collection of documents which includes documents belonging to an information node of one classification, inclusive of documents included in its information subnode, is created in a recursive manner. The created collection of documents and a collection of documents created in accordance with another classification are OR or AND-merged to create a new collection of documents to thereby browse a document in a free combination of classifications.

BRIEF DESCRIPTION OF THE DRAWINGS

FIG. 9 shows a list of documents for a condition retrieval type selected information node;

FIG. 10 shows a selected plurality of condition retrieval type information nodes;

FIG. 11 shows a list of documents present when an AND operation is designated for a plurality of condition retrieval type information nodes;

FIG. 12 shows a list of documents present when an OR operation is designated for a plurality of condition retrieval type information nodes;

FIG. 19 is a list of documents present when a plurality of narrowing-down retrieval type views is designated;

FIG. 20 is a list of documents present when "deep" is designated as a logical operation mode for an information node for which a plurality of narrowing-down retrieval type views is designated;

DESCRIPTION OF THE PREFERRED EMBODIMENT

Figure 1:
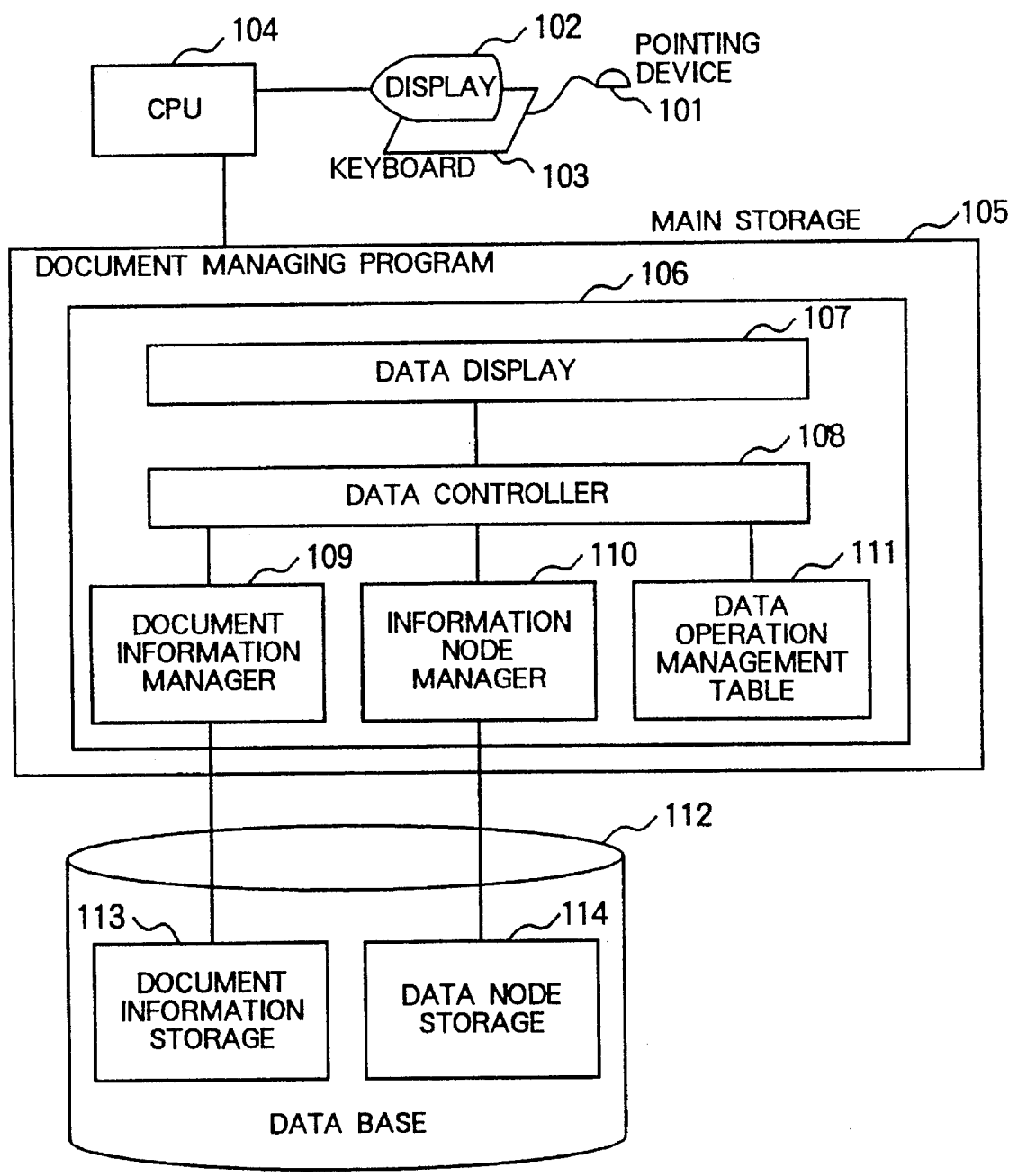
FIG. 1 shows the basic structure of an embodiment of the present invention.

FIG. 1 shows the basic structure of the present embodiment.

An input/output unit for the user is composed of a pointing device such as a mouse 101, a display 102, a keyboard 103, and accesses through a CPU 104 to an main storage 105. The main storage 105 includes a document managing program 106, which, in turn, includes a data display 107 which displays data, a data controller 108 which controls data in accordance with a user's request, a document information manager 109 which manages documents, an information node managing unit 110 which controls information nodes, and a data operation/management table 111 which edits a document. A data base 112 includes a document information storage 113 which stores documents, and an information node storage 114 which stores information nodes.

Figure 2:
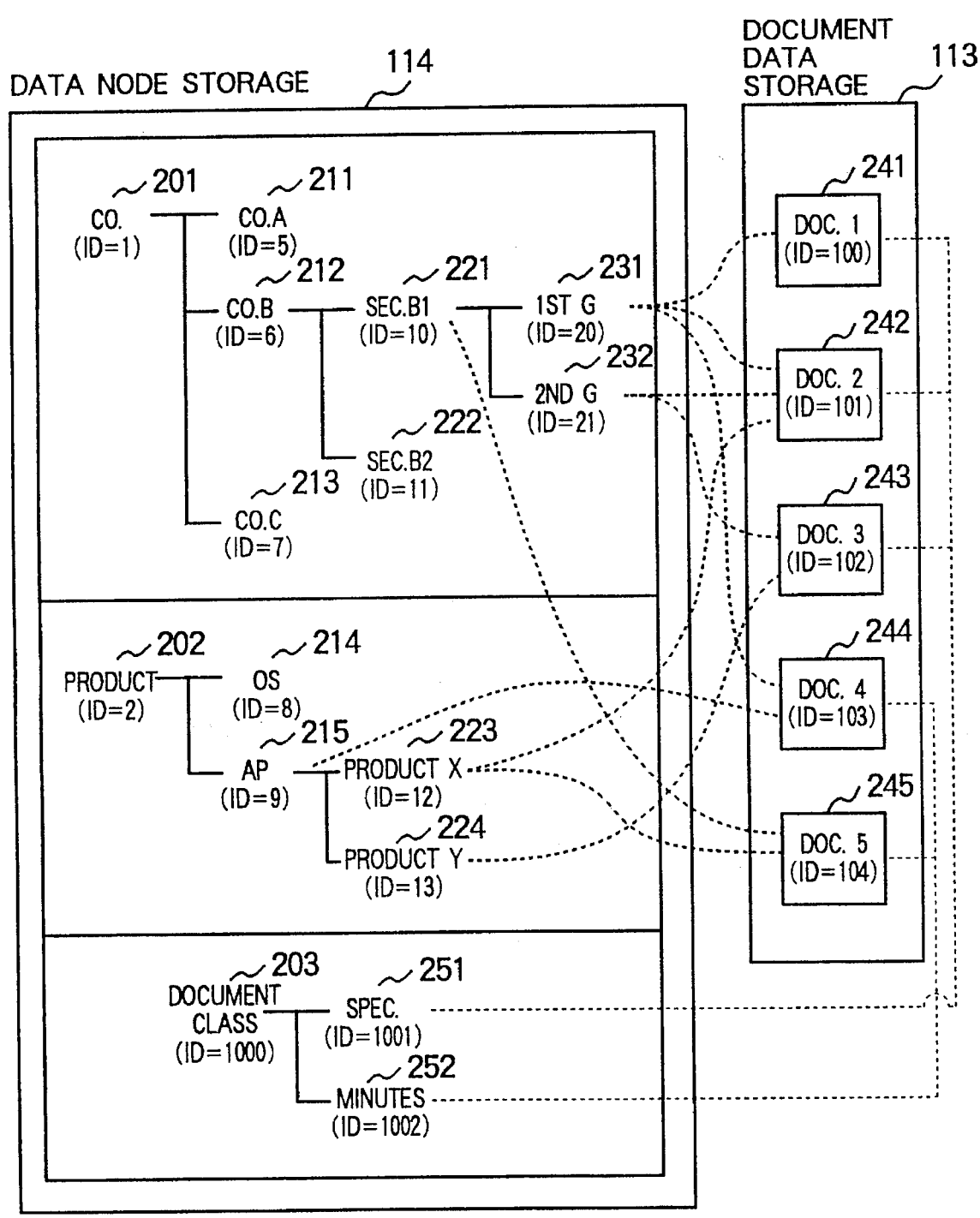
FIG. 2 shows the relationship between view, information node and document used in the present embodiment.

FIG. 2 shows the relationship between the information nodes of the information node storage 114 and documents in the document information storage 113 in the present embodiment. The information node mainly includes three kinds of views; i.e., a company 201, a product 202, and a document class 203. The information nodes and the respective documents have an ID for identifying purposes.

The view of the company 201 has companies A 211, B 212 and C 213 as subnodes. The subnode of the company B 212 has sections B1 221 and B2 222. The subnode of the section B1 221 has a first G 231, a second G 232 and a document 5(245). This document 5(245) is directly related to the section B1 221. The first G 231 is related to documents 1(241), 2(242) and 4(244). The second G 232 is related to documents 2(242) and 3(243).

The view of a product 202 has an OS 214 and an AP 215 as subnodes. The AP 215 is related to the nodes of the products X 223, Y 224 and to the document 4(244). The product X 223 is related to the documents 2(242) and 5(245). The product Y is related to the document 3(243).

The view of the document class 203 has a specification 251 and minutes 252. The specification 251 is related to the documents 1(241), 2(242) and 3(243). The minutes 252 are related to the documents 4(244) and 5(245).

By using the information node, as described above, one document (for example, document 3(243)) is manageable in a plurality of classifications (company B, section B1, second 2G, AP product Y), irrespective of the OS file system structure.

Figure 3:
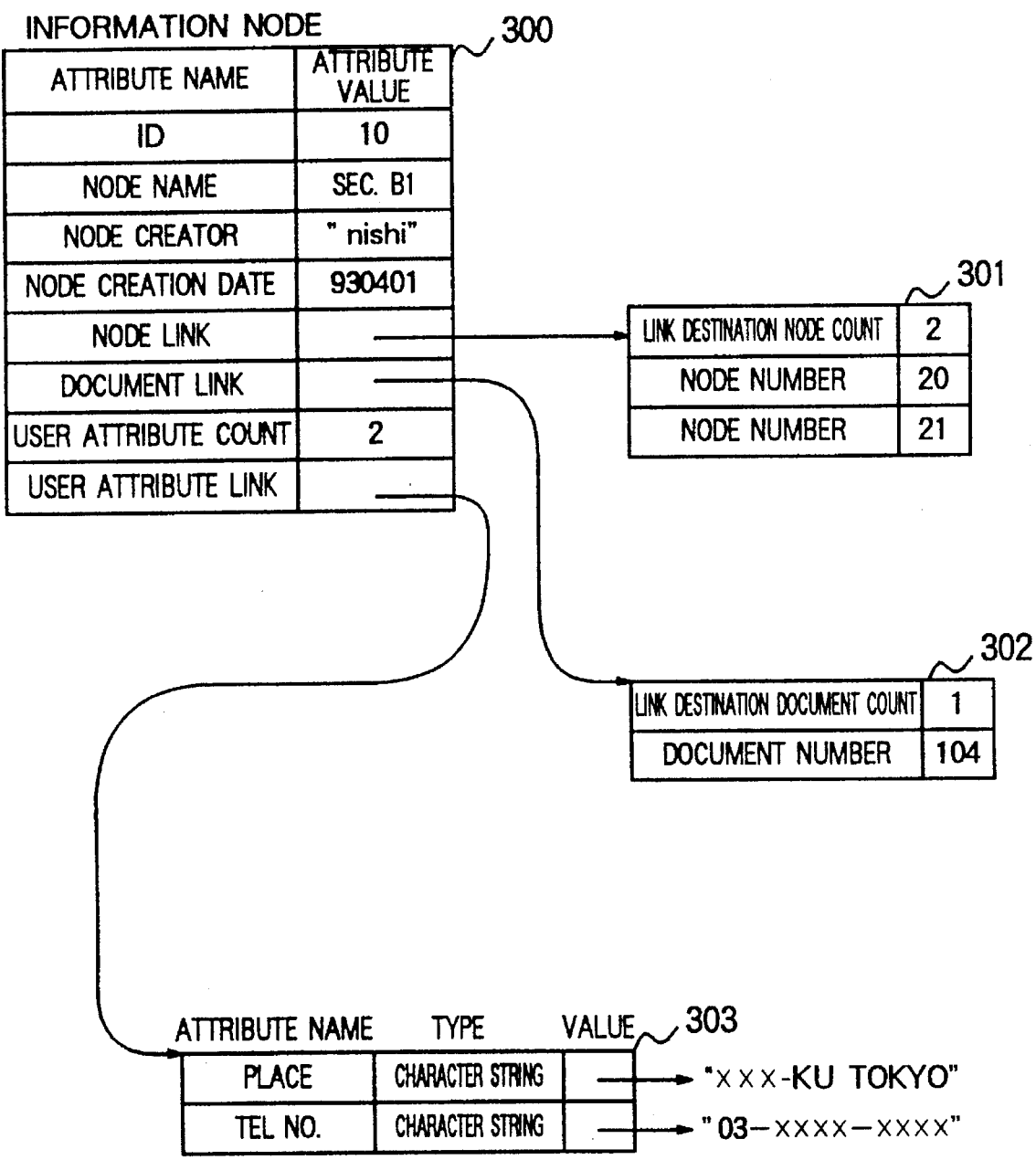
FIG. 3 shows the structure of a table which manages data on the attributes of an information node.

FIG. 3 shows the structure of an information node used when the documents are classified. The information node is creatable when the user desires to classify the documents arbitrarily in addition to the document class and is linkable with a document. A document is browseable on the basis of the created information node. An information node 300 is one created by the user and shows one example of section B1 221 of FIG. 2. The information node 300 includes data on an ID, the node creator's name, and the node creation date. A node link 301 stores data on a node count linked with subnodes and the IDs of the subnodes. A document link 302 stores data on a document count related to that node and the IDs of the documents. User attribute information 303 is given arbitrarily by the user and capable of storing information on an address in that node (company's organization) in that node.

Figure 4:
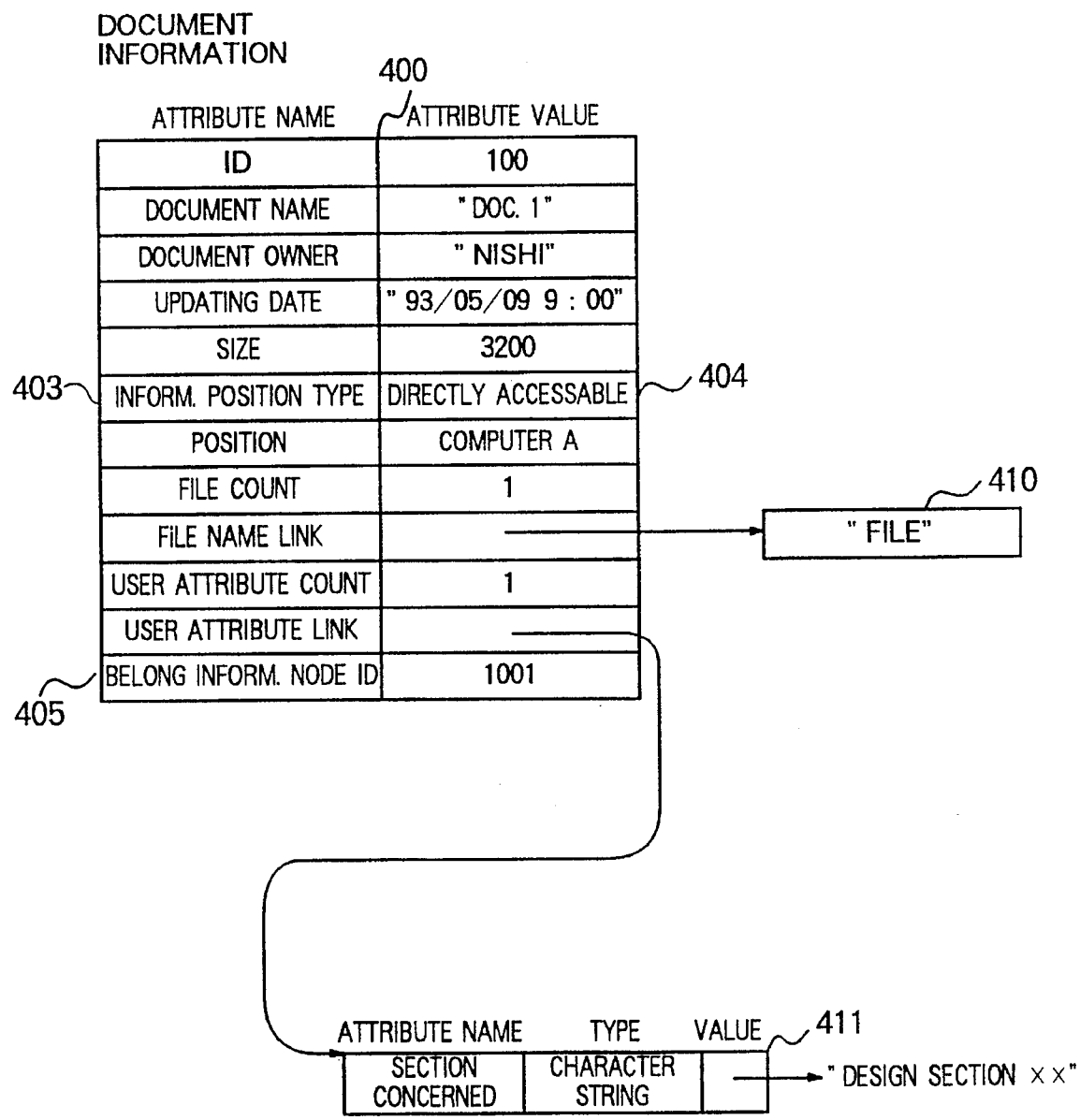
FIG. 4 shows the structure of a table which manages data on document information.

FIG. 4 shows the structure of document information which manages documents. The document information shows an example of the document 1(241). A belonging information node ID 405 stores a document class node to which a document belongs. A document 1(241) is related to a specification 251 and stores 1001 which is the ID of the specification 251. Document information 400 stores data on the ID, document name, document owner, updating date, document size, place where the document is stored, and component file count. An information position type 403 stores a file name 410 used in a plurality of computers when it is directly accessible indicated by 404, and the position information node ID 405 is traceable to obtain an AP of a document class to which the document belongs to thereby start up the AP. When direct access cannot be made, the information position type, for example, stores information on the position of a document shelf on which documents are put, and the system is capable of managing documents which are not yet electronized in the computer. The user information link 411 is similar to the user information link 303 of FIG. 3.

Figure 6:
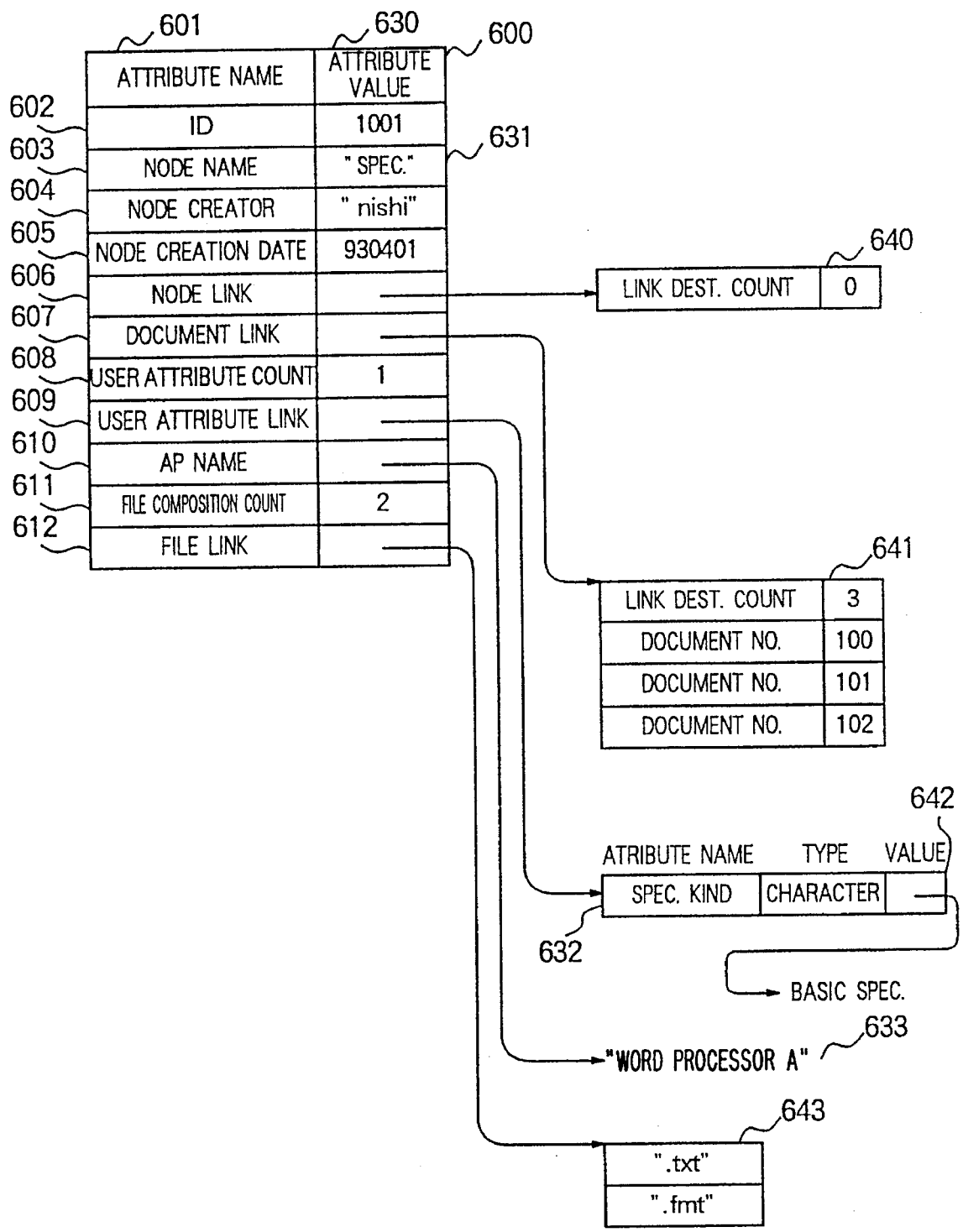
FIG. 6 shows the structure of a table which manages data on the attributes of a document class information node.

FIG. 6 shows the structure of a document class information node. This example indicates that the document class is a specification 251. The respective documents belong to a document class information node which indicates the kind of a document. A document class information node 600 has attributes composed of an attribute name 601 and an attribute value 630. The information node attribute 601 has an ID 602, node name 603, node creator name 604, node creation date 605, node link 606, document link 607, user attribute count 608, user attribute link 609, AP name 610, file composition count 611, and file link 612. The node link 606 has information 640 on information subnodes with which the information node is linked. Since the specification 251 has no subnodes, the link destination node count is 0. The document link 607 has document information 641 with which the information node is linked. The AP name 610 stores an AP name used when the document is updated. Herein, the AP name 610 indicates the use of an AP having the name "word processor A". The user attribute link 609 is the same as 303 of FIG. 3 and set by the user arbitrarily. The file link 612 has an attribute corresponding to file types 643 of documents belonging to the information node. As described above, since the information node 600 has the AP name, it has information on the AP by which the document is created. Therefore, when a document belonging to the information node is desired to be edited, the corresponding application can be started up and the application is not required to be indicated when the already recorded document is updated, advantageously. Only the AP information in the node is required to be changed to change the AP name. Since the information node is capable of holding a file structure related to the AP, the files can be copied in a lump when a document is desired to be copied.

Next, embodiments for the condition retrieval type (FIGS. 7–19) and the narrowing-down retrieval type (FIGS. 20–28) browsing will be described with reference to pictures and a PAD below.

First, the condition retrieval type browsing will be described.

Figure 7:
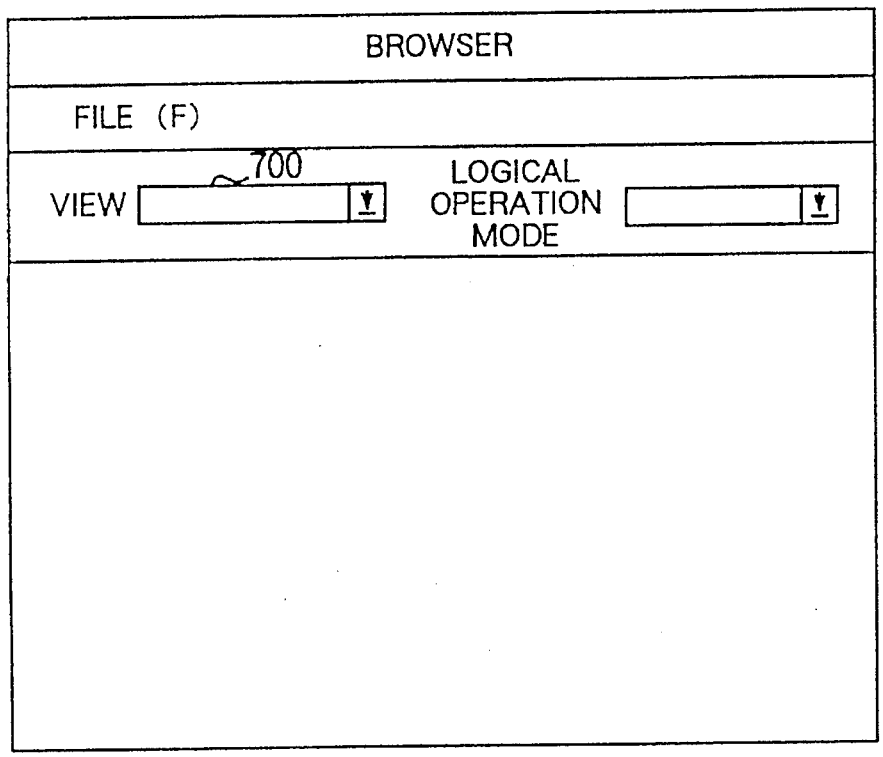
FIG. 7 shows a condition retrieval type initial picture.
Figure 8:
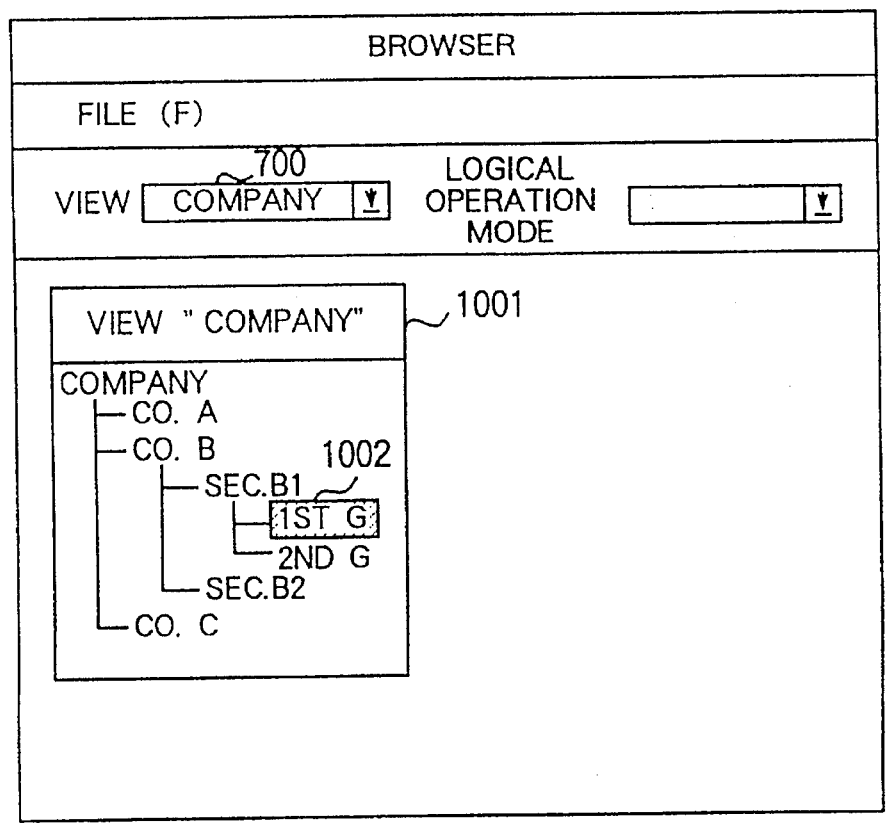
FIG. 8 shows selection of a condition retrieval type information node.
Figure 21:
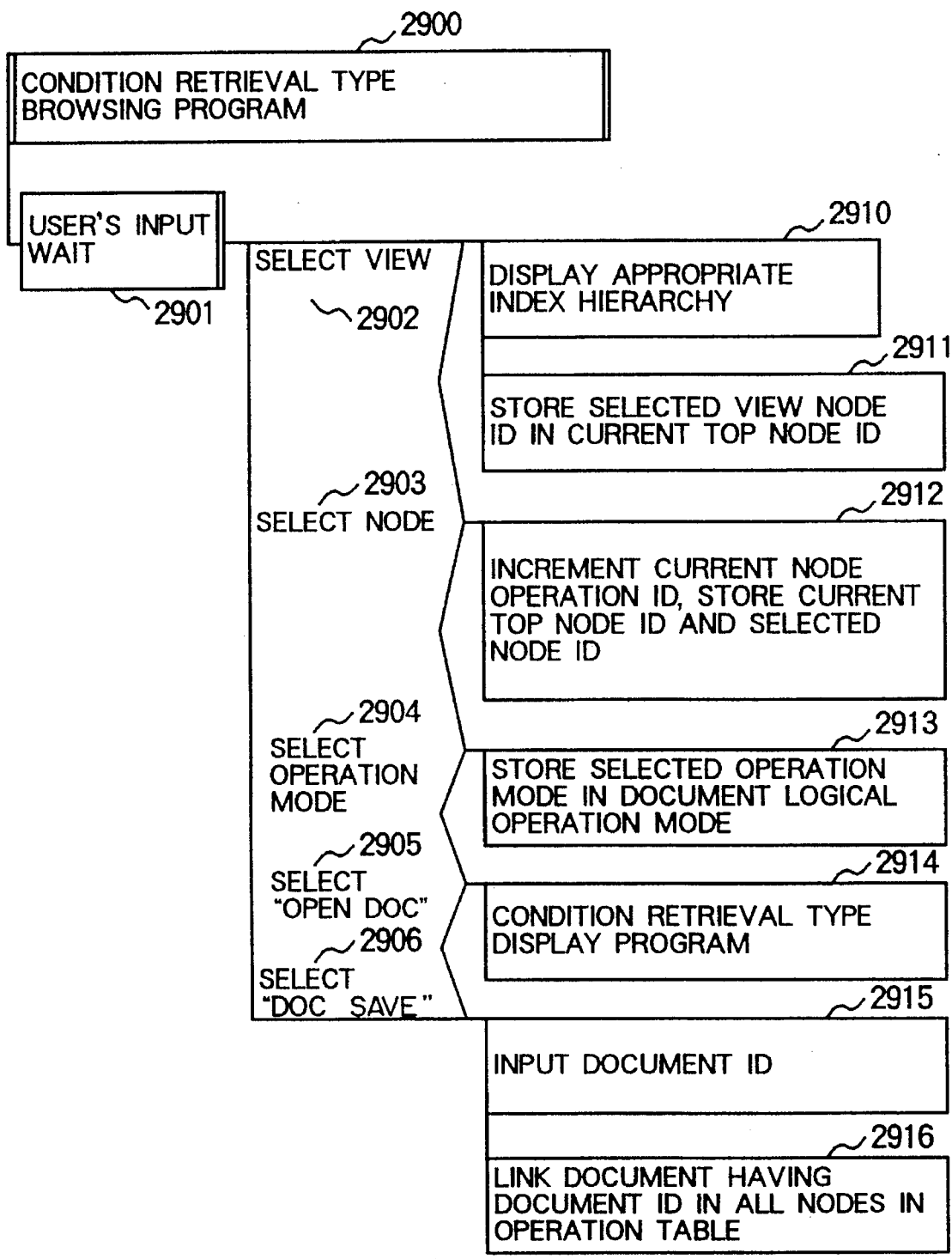
FIG. 21 shows a condition retrieval type browsing program.

FIG. 7 shows a condition retrieval type initial picture, which shows that a condition retrieval type browsing program 2900 of FIG. 21 has been executed and that control is waiting for the user's data input (step 2901). A view 700 is selected (step 2902) and a "company" is selected from a pull-down menu. This causes "company" to be displayed on the view 700, as shown in FIG. 8, and the appropriate information node hierarchy 1001 is displayed (step 2910). At this time, the ID=1 of the company 201 is stored in the current top node ID 502 of FIG. 5. When a first G 1002 is selected from a node hierarchy 1001 (step 2093), the current node operation ID 501 is incremented and the current top node ID (ID=1) and the selected node ID (ID=20) are stored in the operation table 504 of the current node operation ID (step 2912). Thereafter, even when another information node is selected, similarly, the current node operation ID 501 is incremented such that the current top node ID and the selected node ID are stored in the operation table 504 of the current node operation ID (step 2912). Next, "open a list of documents" is selected from the pull-down menu (not shown) of the FIG. 8 file (F) (step 2905). This causes the condition retrieval type display program to be executed (step 2914), and, as a result, documents 1(1203), 2(1204) and 4(1205) are displayed in a document sight list 1202 shown in FIG. 9.

Figure 22:
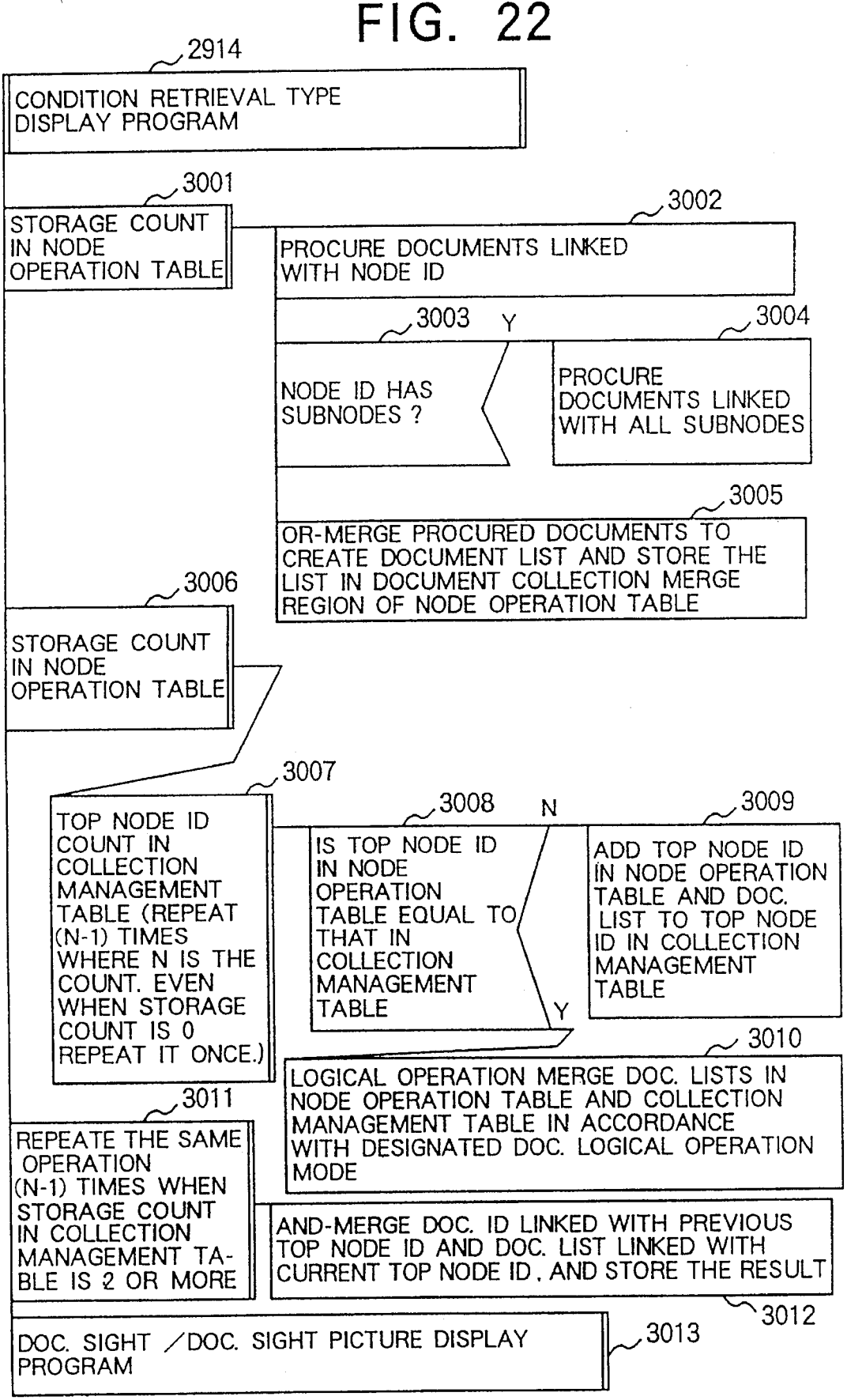
FIG. 22 shows a condition retrieval type display program.

The condition retrieval type display program 2914 of FIG. 22 performs a document procuring process for the document count 3001 stored in the node operation table 504, and the documents linked with the node ID are procured (step 3002). If the node ID has subnodes (step 3003), documents linked with all the subnodes are procured (step 3004). The procured documents are OR-merged to create a document list 505, which is stored in the node operation table 504 (step 3005). When the user selects a plurality of information nodes, the node operation table 504 has stored a plurality of node IDs. Therefore, a document procurement process is performed on all the nodes stored in the node operation table 504. After this process, a logical operation by the user's designation is performed for each top node ID to create one document list, which is executed when the user has selected a plurality of views. In this case, a similar logical operation is repeated for the storage count in the node operation table (step 3006), the top node ID of the collection management table is compared with the top node ID of collection management table 506 (step 3008). If the same top node exists, an OR- or AND operation designated by the user and stored in the document logical operation mode 503 is executed on the document list 505 of the node operation table 504 and the document list 507 of the collection management table 506 to merge the documents to thereby update the document list 507 (step 3010). If there is not the same top node ID, the top node ID and document list 505 of the node operation table 504 are stored in the collection management table 506 (step 3009). When the logical operation ends for each top node ID, the same operation is repeated for the storage count in the collection management table (step 3011), the document lists which the respective top node IDs have are AND-merged (step 3012) and the result is displayed in the document list 1202 (step 3013).

In the above example, the storage count in the node operation table 504 is 1, and the documents with which the node ID=20 is linked are procured (step 3002). That is, the documents 1(241), 2(242) and 4(244) are procured. It is then determined whether the node ID has subnodes (step 3003). Since there are no subnodes, the procured documents are stored in the document collection merge region of the node operation table 504 (step 3005). Since nothing is stored in the collection management table 506, the top node ID of the node operation table 504 is not equal to the top node ID of the collection management table 506 (step 3008). The top ID=1 of the node operation table 504 and the document list for the node ID=20 in the document collection merge region are stored in the collection management table 506. Thus, the storage count in the collection management table 506 is 1. The AND merging application of the document lists of the respective top nodes IDs is performed, but the storage count is only one. Therefore, the documents contained in the document list are displayed in the document list (steps 3013, 3101).

Next, when a first G 1002 and a second G 1003 are selected from among the node hierarchy 1001 of FIG. 10 and an AND 1004 is selected in the AND operation mode, the above-mentioned condition retrieval type browsing program 2900 and the condition retrieval display program 2914 are executed and the resulting document list is created. Here, an information node is selected in the same view, so that an AND merge operation is performed on the document lists of the first G 1002 and second G 1003. As a result, a document 2(1402) is displayed in the document sight list 1401, as shown in FIG. 11. When an OR operation is designated in the logical operation mode, document 1(1502), 2(1503), 3(1504) and 4(1505) are displayed in the document sight list 1501, as shown in FIG. 12. In this example, information on two nodes is stored in the node operation table 504. The stored information is on a node ID=20 for the top node ID=1 and node ID=21 for the top node of ID=1. The procurement of documents for each node is performed in a manner similar to that mentioned above. The former document list includes documents 1(241), 2(242), 4(244) while the latter document list includes documents 2(242), 3(243). The respective created document lists are stored in the document collection merge region. A similar operation is repeated for the stored document count in the node operation table 504. In the first repetitive process, nothing is stored in the collection management table 506, so that there is no top node ID which is equal to the first top node ID=1 of the node operation table 504 (step 3008). Therefore, like the previous example, a document list for the top node ID=1 and ID=20 is stored in the collection management table 506 (step 3009). In the second repetitive process, the top node ID=1 of the node operation table 504 is equal to the top node ID=1 of the collection management table 506 (step 3008). The document list of the node ID=21 of the node operation table 504 and the document list of the collection management table 506 are subjected to an AND operation designated by the user and the document list obtained as a result of the operation is handled as the document list of the top node ID=1 of the collection management table 506. The document list in this example includes a document 2(242) and the storage count in the collection management table 506 is 1. A similar operation is repeated for the storage count in the collection management table 506 (step 3011), but the storage count is only one, so that the document (2(242)) included in the document list of the top node ID=1 of the collection management table 506 is displayed in the document list (step 3013). If the user's designation is an OR operation, documents 1(241), 2(242), 3(243) and 4(244) are displayed (step 3013).

Figure 5:
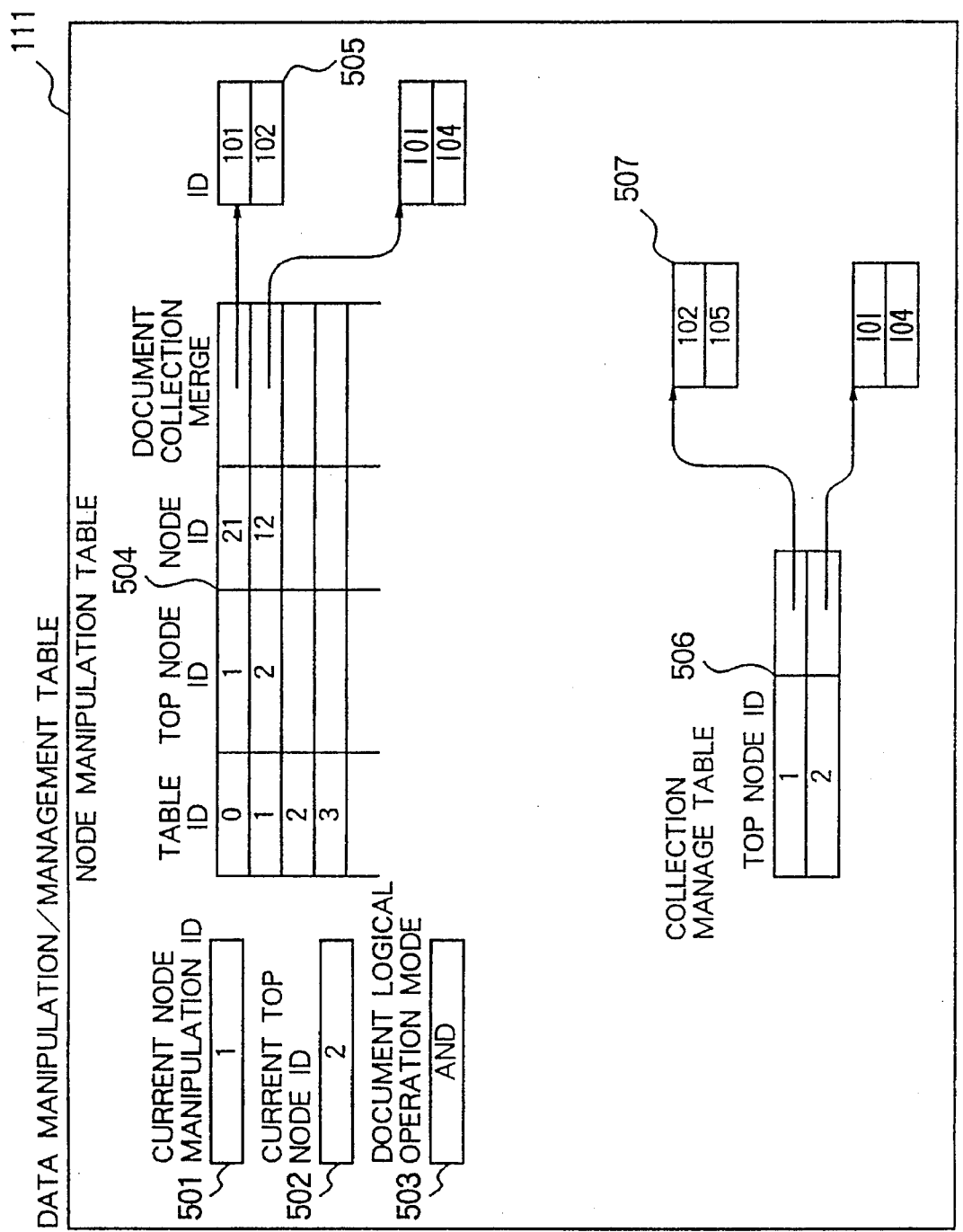
FIG. 5 shows a work table used in a system when documents are narrowed down.
Figures 13, 14:
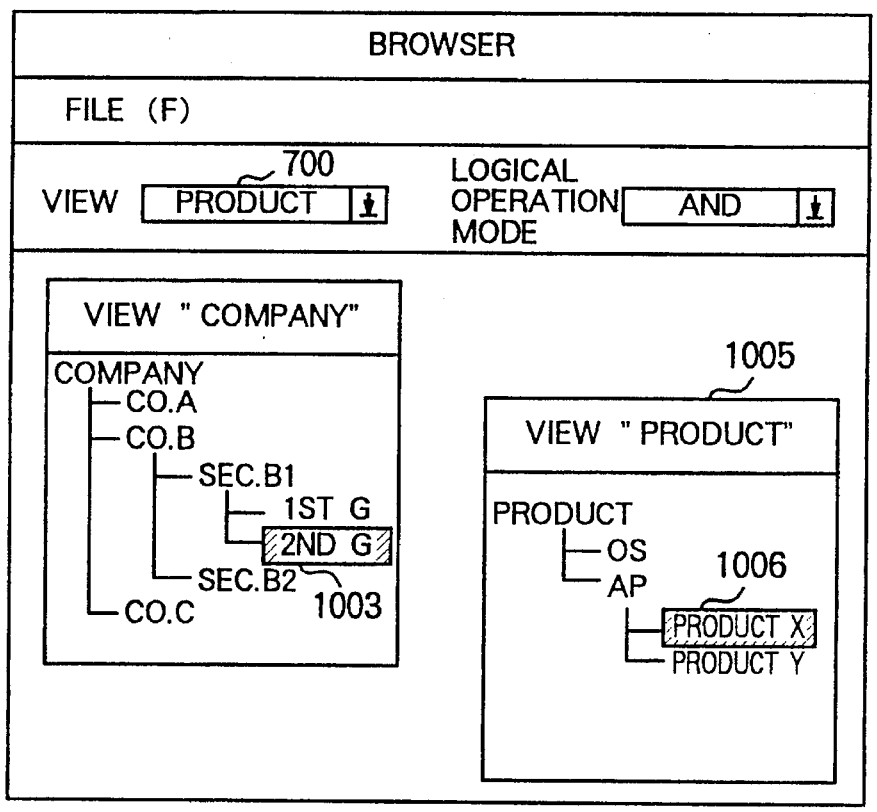
FIG. 13 shows selection of an information node for a condition retrieval type changed view.
FIG. 14 shows a list of documents present when an information node for a plurality of condition retrieval type views is selected.

FIG. 13 shows a change of a view after selection of a second G 1003 from among the companies of the view. In this case, a view 700 has been changed into a product by using a pull-down menu and a node hierarchy 1005 has been displayed. When a product X 1006 is selected from the node hierarchy and the document list is opened, the document 2(1902) is displayed in the document list 1901, as shown in FIG. 14, as a result in accordance with the above program. That is, here, the document list of the second G 1003 for the company of the view is created, a document list for a product X 1006 for the product of the view is created; both the document lists are then AND-merged in the collection management table 506 and the result is displayed. The value of FIG. 5 shows the values in the execution of this example. In this example, first, the second G 232 of the company 201 of the view is initially selected while the top node ID=1 and node ID=21 are stored in the node operation table 504 in the same move as the previous example (step 2912). Next, since a product X 223 of the products 202 of the view is selected, the top node ID=2 and node ID=12 are stored in the second row of the node operation table 504 (step 2912). For those two nodes ID, the corresponding documents are procured (step 3002), and the corresponding lists are created and linked with the respective document collection merge regions (step 3005). That is, in this case, the former document list includes documents 2(241), 3(242) while the latter one includes documents 2(242), 5(245). Next, a collection management table 506 is created from the node operation table 504. Since the top node ID of the node operation table 504 is not equal to that of the collection management table 506, the collection management table 506 includes the document list of the top node ID=1 and node ID=21 and the document list of the top node ID=2 and node ID=12 (steps 3006, 3007, 3008, 3010). A similar operation is repeated for the storage count in the collection management table 506 (step 3011). The document lists linked with the respective top nodes ID are then AND-merged (step 3012) and the document (document 2(242)) included in the resulting document list is displayed in the document list (step 3013). That is, in this example, advantageously, a document is narrowed down by a simple browsing operation of designating a plurality of nodes and displaying the list of documents.

The narrowing-down retrieval type will be described next with reference to FIGS. 15–20 and 24–26.

Figure 15:
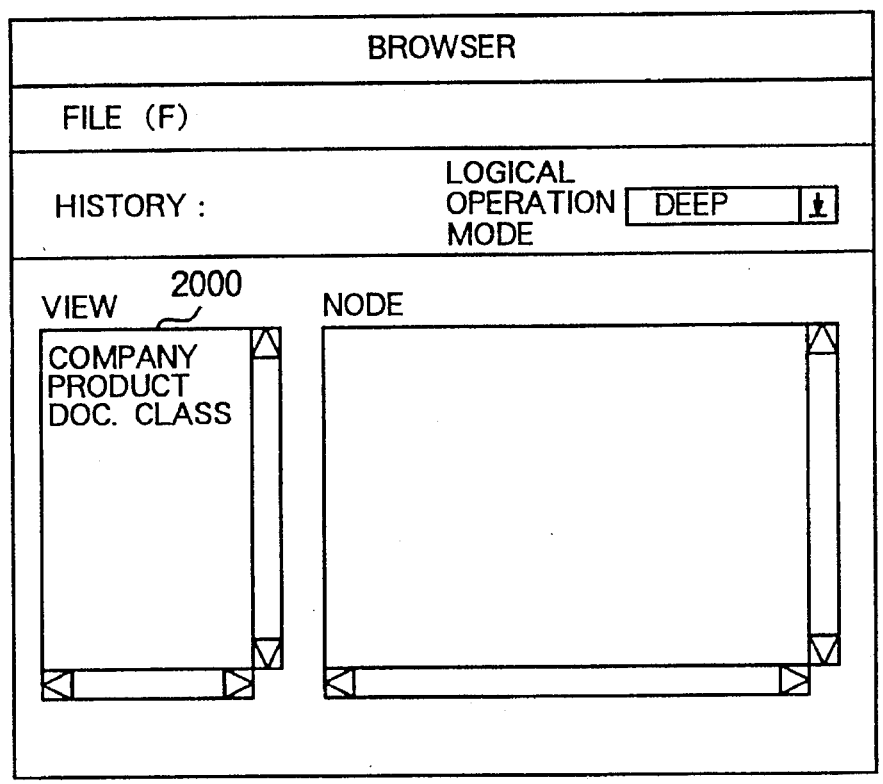
FIG. 15 shows a list of views displayed on a narrowing-down retrieval type initial picture.
Figure 16:
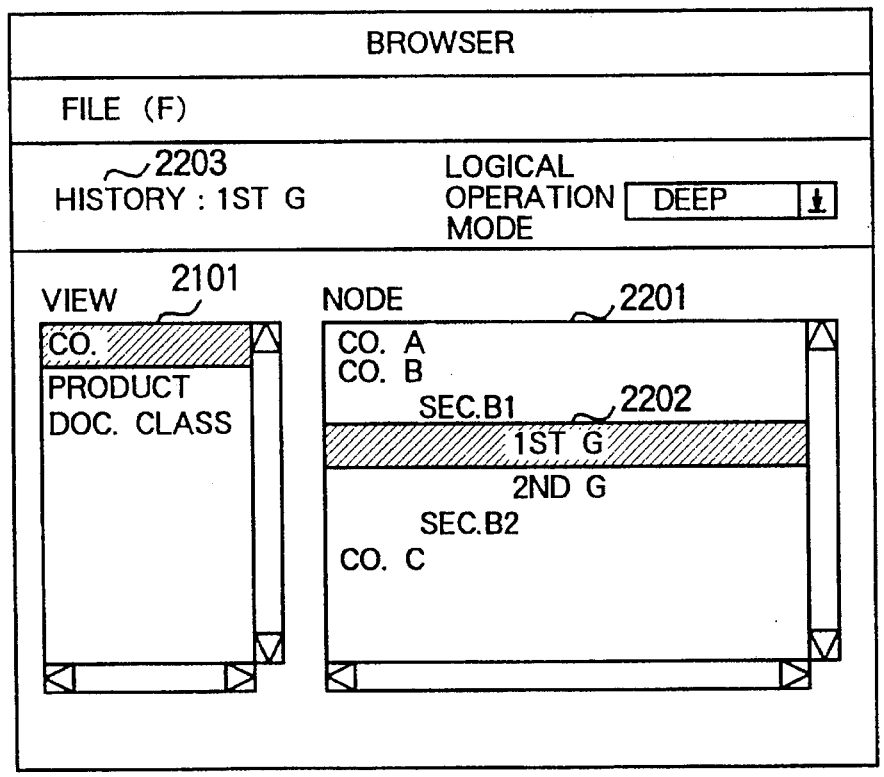
FIG. 16 shows selection of a narrowing-down retrieval type information node.
Figure 17:
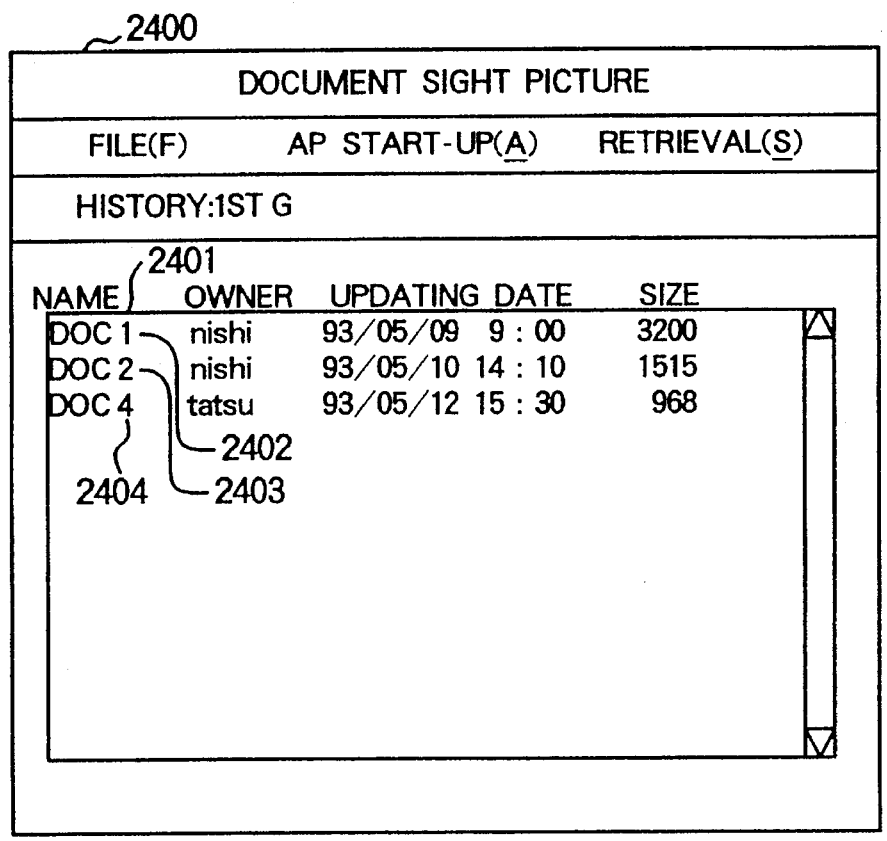
FIG. 17 shows a list of documents for a narrowing-down retrieval type information node.

FIG. 15 shows an initial picture for a narrowing-down type retrieval on which a view list 2000 is displayed beforehand. In this state, a narrowing-down retrieval browsing program 3200 has been executed and control is waiting for the user's inputting operation (step 3201 of FIG. 24). When a company 2101 is selected from the view list of FIG. 16 (step 3202), an information node is displayed in the node sight 2201. If the information node is already displayed (step 3210), this information node is erased (step 3211) and the information node for the view is newly displayed (a symbol is added to this new information node if the document list has already been created) (step 3212). At this time, the view node ID=1 is stored in the current top node ID 502 (step 3213). When a first IG 2202 of the information node is selected from the node sight 2201 (step 3203); the current node operation ID 501 is incremented, the current top node ID (ID=1) and the selected node ID (ID=20) are stored in the operation table 541 for the current node operation ID (step 2912); and a first G is displayed in the history column 2203 (step 3215). Subsequently, when another information node is selected, similarly, the current node operation ID 501 is incremented, the current top node ID and the selected node ID are stored in the operation table 504 for the current node operation ID (step 2912), and the selected information node is displayed in the history column 2203 (step 3215). "Open 2602" is selected from "file 2601" of the menu of FIG. 18. When "open" 2602 is selected (step 3205), the narrowing-down retrieval type display program 3217 is executed, so that documents 1(2402), 2(2403) and 4(2404) are displayed in the document sight list 2401, as shown in FIG. 17, as a result of the processing of the narrowing-down type display program, as shown below.

Figure 25:
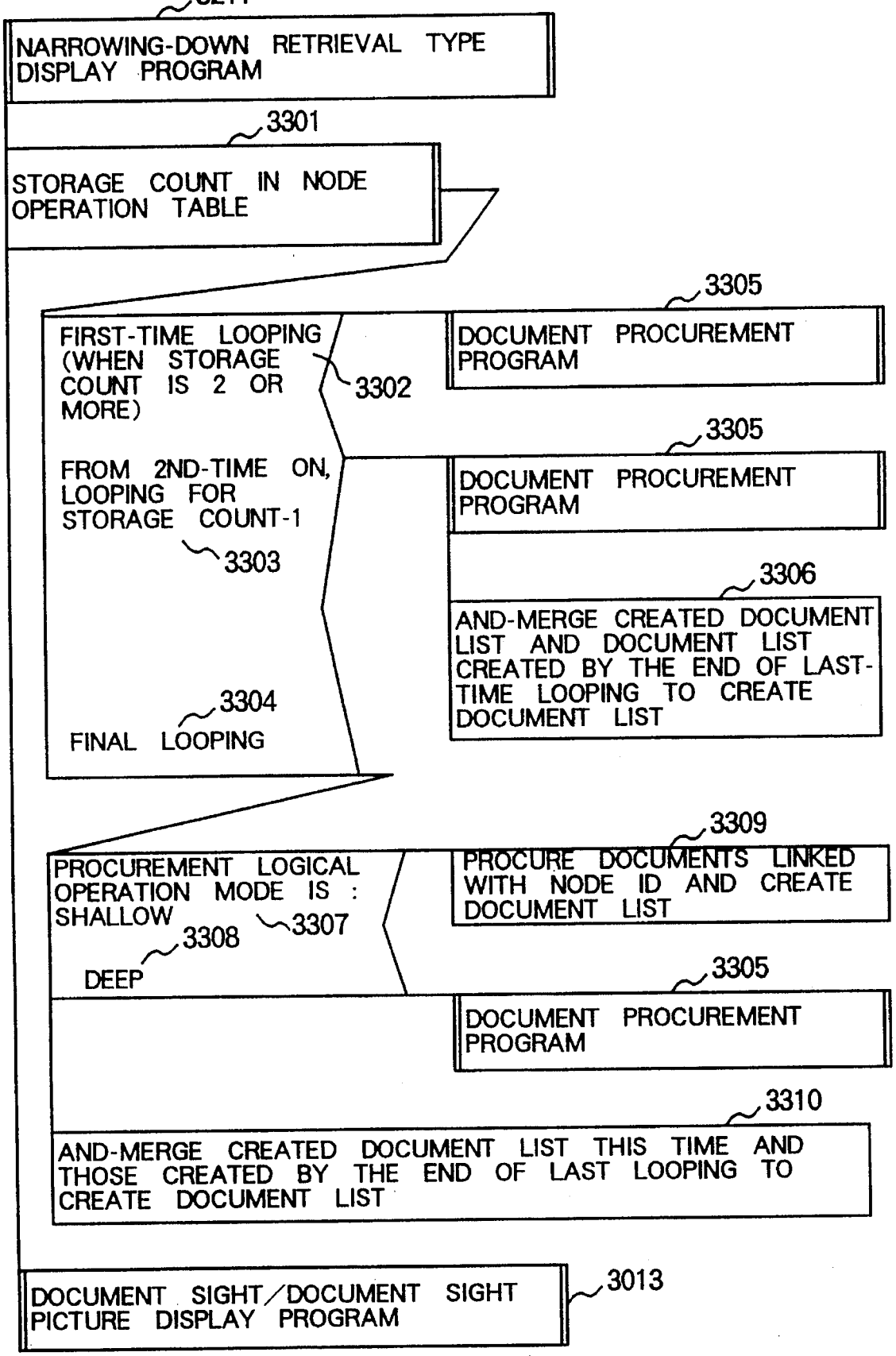
FIG. 25 shows a narrowing-down retrieval type display program.
Figure 26:
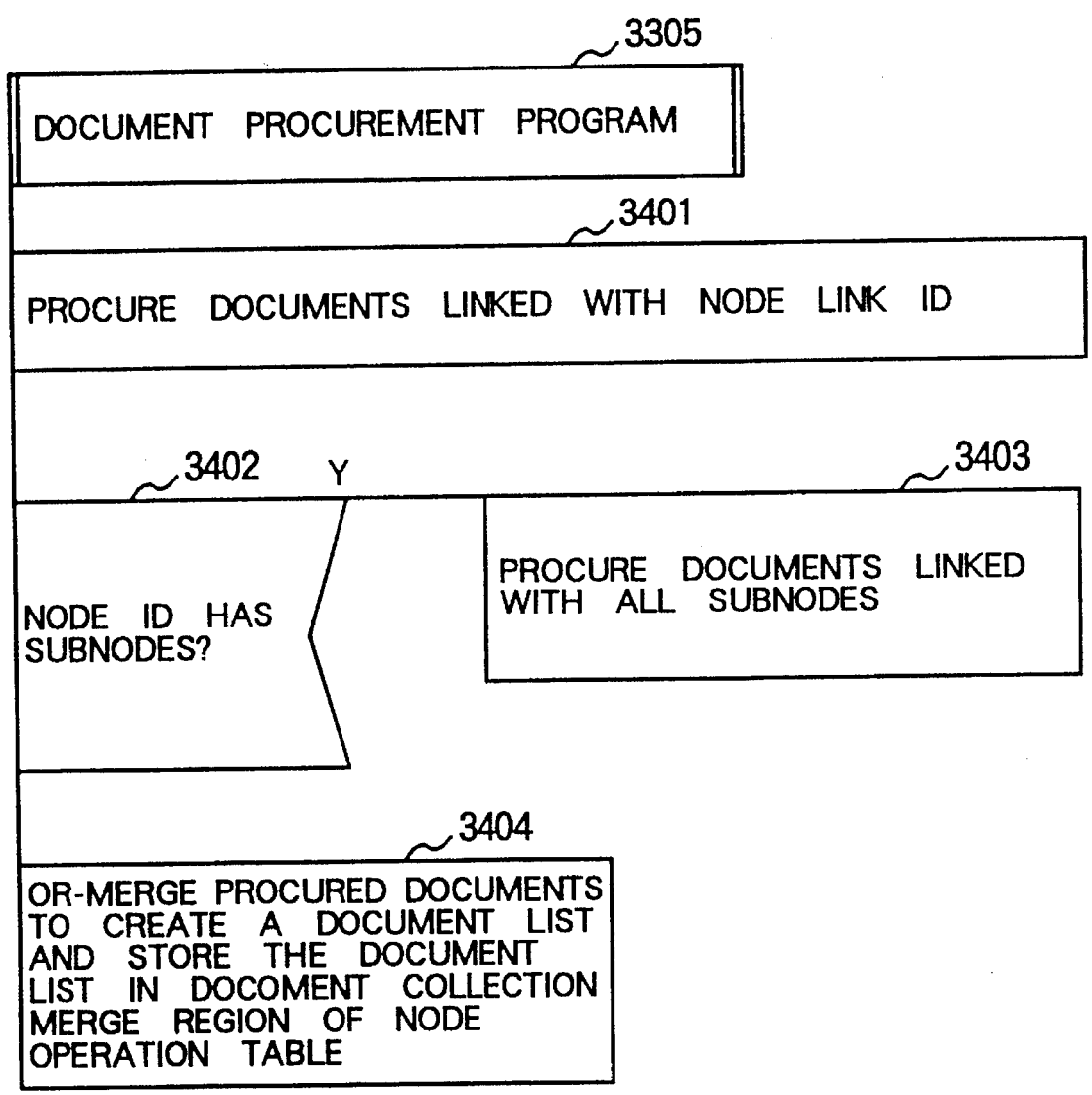
FIG. 26 shows a narrowing-down retrieval type document procuring program.

The narrowing-down type retrieval display program 3217 of FIG. 25 executes a document procurement process for a storage count 3301 stored in the node operation table 504. Since it is a narrowing-down retrieval, an AND operation on the document lists is executed in each repetitive operation. That is, at the first time (step 3302) the document procurement program is executed (step 3305), documents which are linked with the node ID are procured (step 3401). When that node ID has subnodes (step 3402), the documents linked with all the subnodes are procured (step 3403). The procured documents are OR-merged to create a document list 505, which is then stored in the node operation table 504 (step 3404). When the user has selected a plurality of information nodes, the second and subsequent repetitive operations are executed. In the second and subsequent processes (step 3303), the document list which executed the document procurement program and the document list 505 created in the previous repetitive process are AND-merged to create a document list 505, which is then stored in the node operation table 504 (step 3306). In the final repetitive process (step 3304), the operation is executed by referring to the designation of an AND operation mode for the finally selected information node. The document logical operation mode 503 includes "DEEP" and "SHALLOW" ones. The "DEEP" mode 3308 is for procuring documents linked with the selected information node and the documents linked with all the subnodes of that information node. The result in this case is the same as that obtained when the document program 3305 is executed. The "SHALLOW" mode 3307 procures only documents linked with a selected information node (step 3309). The document list obtained in the "DEEP" or "SHALLOW" mode and the document list 505 obtained in the previous repetitive process are AND-merged to create the final document list 505, which is then stored in the node operation table 504 (step 3310). After the creation of the final document list 505, all the documents included in the document list are displayed in a document sight picture 2400 (step 3013).

In the above embodiment, the top node ID=1 and the node ID=21 are stored in the node operation table 504. One item of information is stored in the node operation table 504. Although one item of information is stored in the table, the final loop is executed (step 3304). The document procurement program 3305 (since the document logical operation mode gives the "DEEP" mode in a default unless designated, the process in the "DEEP" mode) is executed (step 3308).

Documents linked with the node ID=20 are procured (step 3401). Since the mode has no subnodes (step 3402), a document list of the procured documents (1(241), 2(242) and 4(244)) is created, which is then stored in the document collection merge region (step 3404). The documents 1(241), 2(242) and 4(244) included in this document list are displayed on the document sight picture (step 3013).

Figure 18:
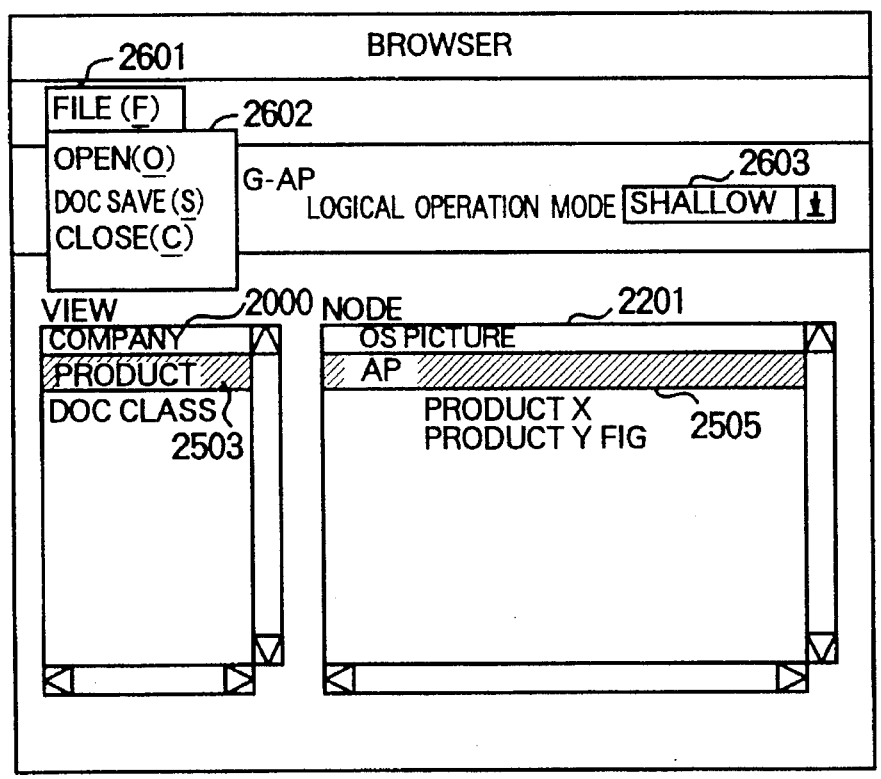
FIG. 18 shows the designation of a "SHALLOW" mode as A logical operation mode and the operation of opening a list of documents in the selection of an information node for a plurality of narrowing-down retrieval type views.

A first G is selected from the company of the view (the "first G" is displayed in the history column of FIG. 18). When a product 2503 is then selected from the view list 2000, the information node of the product 2503 is displayed in a node sight 2201, from which AP 2505 is selected and displayed in a history column 2203. When the logical operation mode is then switched to "SHALLOW" 2603 and "open" 2602 of a "file" 2601 menu is then selected, the document 4(2702) is displayed in the document sight list 2701 of FIG. 19 by the narrowing-down retrieval type browsing program 3200 and the narrowing-down retrieval display program 3217. When the logical operation mode is "DEEP", the documents 2(2802) and 4(2803) are displayed in the document sight list 2801, as shown in FIG. 20. In this example, the node operation table 504 has stored the top node ID=1, node ID=20; and the top node ID=2, node ID=9, while the node operation table 504 has stored two items of information. A first loop is then executed (step 3302), the document procurement program 3305 is executed and the document list composed of the documents 1(241), 2(242) and 4(244) for the node ID=20 is stored in the document collection merge region. Subsequently, the final loop is executed (step 3304). Since the document logical operation mode 503 is a "SHALLOW" one designated by the user (step 3307), only a document 4(244) linked directly with the node ID 9 is procured; a document list is created (step 3309); the document list and that created in the previous loop are AND-merged to create a final document list, which is then stored in the document collection merge region for the node ID=9 (step 3310). The document (4(244)) included in this document list is displayed in the document sight picture (step 3013).

When the user's designation is the "DEEP" mode (step 3308), the document 4(244) linked with the node ID=9 is procured (step 3401), and the documents (2(242), 5(245)) linked with the subnode of that node ID are procured (steps 3402, 3403) in accordance with the document procurement program 3305 and the procured documents are OR-merged to create a document list (step 3404). Thus, the document list includes the documents 2(242), 4(244) and 5(245). This document list and the document list of the previous loop are AND-merged to create a document list (of document 2(242), 4(244)), which is then stored in the document collection merge region of the node ID=9 (step 3310). The documents (2(242) and 4(244)) included in this document list are displayed on the document sight picture (step 3013). In this case, since there is the designation of the "SHALLOW" mode which procures only the documents linked with the information node and there is no need for obtaining a document collection for the information subnode, a document collection of improved performance is created, advantageously. In addition, detailed retrieval for procurement of the documents linked with the information node and the subnode is achieved advantageously. Since the nodes which are already narrowed down and unrelated to a new narrowing-down operation are displayed with symbols annexed thereto, a possible unnecessary operation which would otherwise be performed by the user will be prevented, advantageously.

Figure 23:
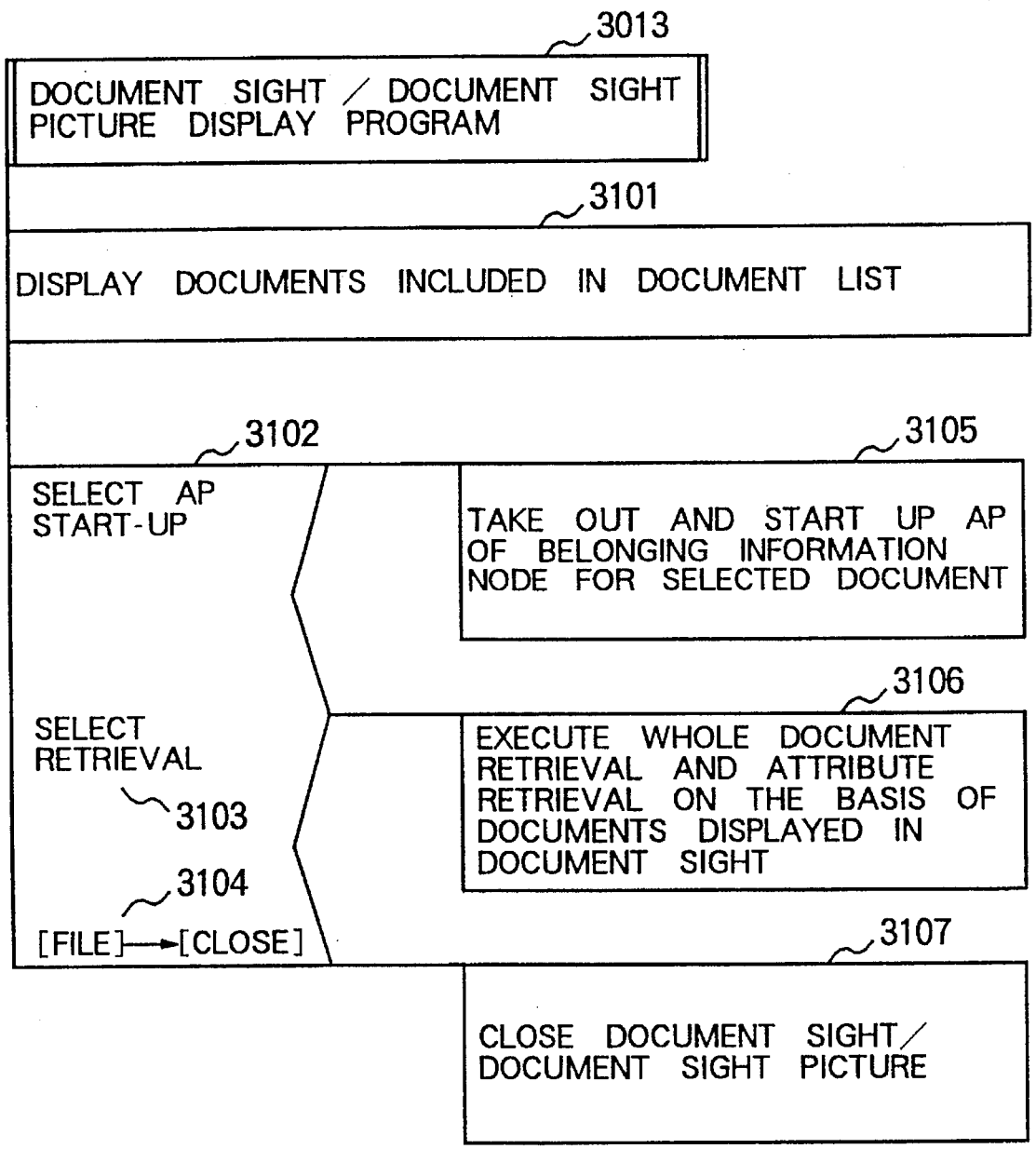
FIG. 23 shows a program indicative of a list of condition retrieval type and narrowing-down retrieval type documents.
Figure 24:
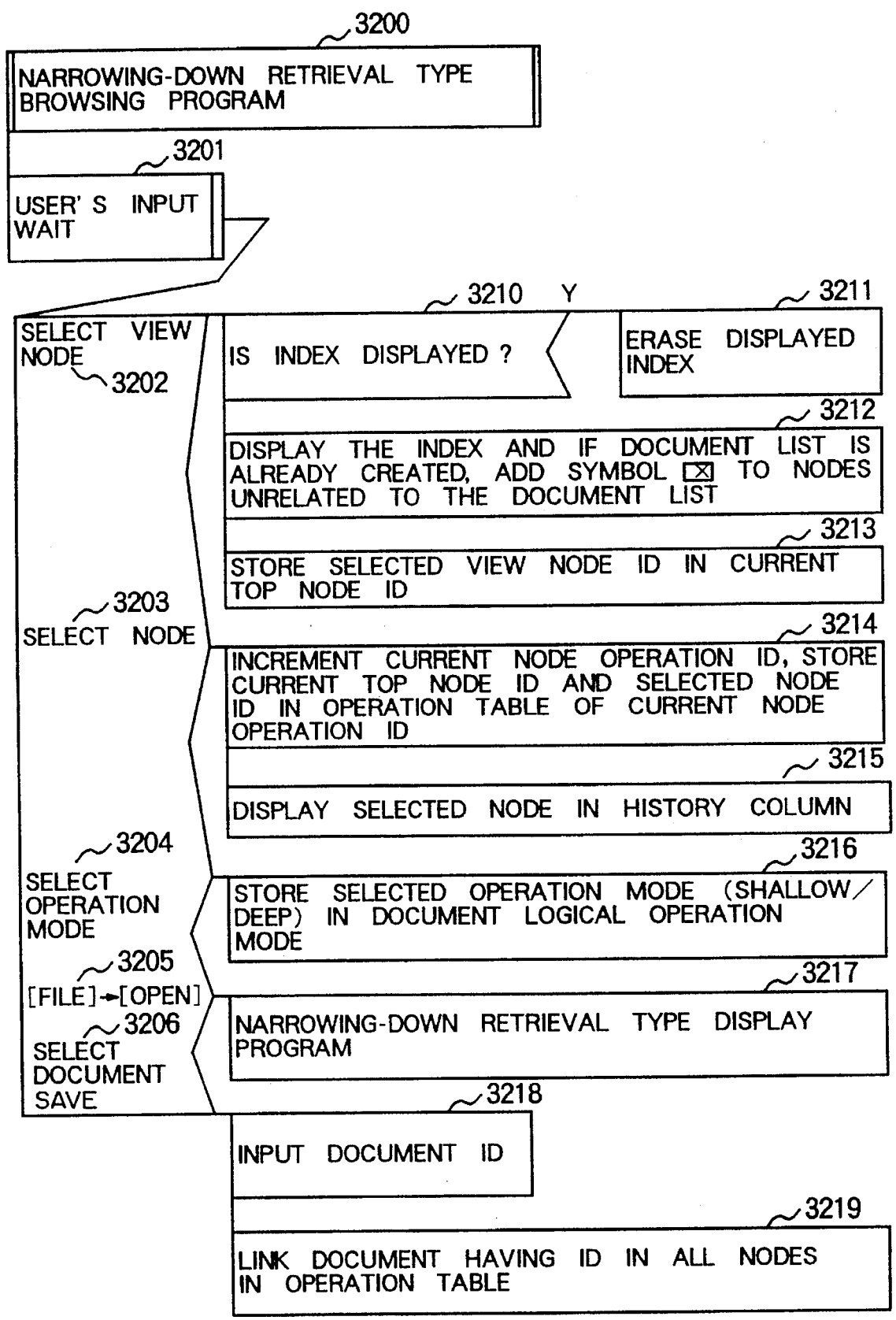
FIG. 24 shows a narrowing-down retrieval type browsing program.

There is a process which is common to the condition retrieval type and narrowing-down retrieval type in the display of the document sight and which is displayed in a "document list/document picture display program" 3013 in FIG. 23. The present program displays in a document sight list the documents included in the final document list (step 3101). When "AP start-up" 1903, 2804 is selected from the menu of the document sight or document sight picture (step 3102), a belonging document node ID 405 involving that document is traceable on the basis of a file 410 for the selected document to take out and start up the AP having an AP name 210 (step 3105). When "retrievals" 1904, 2805 are selected from the menu (step 3103), the attribute retrieval and the whole document retrieval are executable for the documents displayed in the document sight list (step 3106). When "close" is selected from the "file" of the menu (step 3104), the current picture is closed (step 3107).

The documents are recordable on the browsing picture in the case of both the condition retrieval type and narrowing-down retrieval type by selection of "document save (S)" from the "file" 2601 (steps 2906, 3206). When data on a document ID is input (steps 2915, 3218), the documents ID input for all the nodes in the operation table are linked. That is, the documents are recorded in required places by a single operation to thereby eliminate the operation of searching the places where the respective documents are stored and recording the documents, and hence the user's operation time is reduced, advantageously.

When documents are procured by browsing, each document has a right to access. Each document has the function of displaying a document only to the user to whom a right to access is admitted. In more detail, there are node creators for the node names, as shown in FIGS. 2 and 6, in the respective information nodes and the documents which have admitted a right to access are linked at 241 and 301. Thus, the user cannot view the documents which are not in the document link. That is, advantageously, disclosure and update of a document is limited to required users. Since a document collection to be retrieved is created in the process such as disclosed in the present embodiment also when the condition retrieval is desired to be performed, the retrieval performance is improved by narrowing down the conditions beforehand, advantageously.

According to the present invention, the user is capable of managing documents from a standpoint (view) of free classification free from the limitation of the function of a directory and a folder provided by the OS.

Since an information node corresponding to the kind of a document is creatable, files and applications are easily related to that document.

By creation of a plurality of views and selection of the information nodes which constitutes the view, the user is able to search a desired document speedily.

By managing the relationship between the information node and the document in the system without requiring the management of directories and folders even in the system, a document which satisfies the user's need is extracted.

The user easily is able to narrow down a document by selecting an information node displayed on the display picture on the basis of the hierarchy of the information node.

An operation which improves the performance of the extraction of the document, inclusive of not only selection of an information node to narrow down a document, but also extraction of only the documents which are directly linked with the information node or extraction of all the documents of the information subnode in addition to the directly linked documents, and an operation to reduce the number of times of operation are selectable.

When information nodes over which the view extends are selected, the user operation is simplified to thereby narrow down a document automatically because of the logical operation performed in the system.

We claim:

1. A document retrieving method in a document management system which manages documents, using a computer, comprising the steps of:

(a) managing classifications of documents in accordance with a plurality of node trees having nodes linked in a hierarchical structure;

(b) obtaining target nodes inputted by an operator;

(c) when a particular one of the plurality of node trees is designated, OR-merging documents related to all the nodes ranging from documents linked to the target node to documents linked to lower nodes in the node tree which are linked to the target node directly or indirectly to create a collection of documents;

(d) when a new different node tree is designated, OR-merging documents related to all the nodes ranging from documents linked to the target node to documents linked to lower nodes in the new node tree which are linked to the target node directly and indirectly to create another collection of documents; and (e) repeating the steps (b) and (d) and performing an AND-merge operation on the created collections to create and output a final collection of documents.

2. A method according to claim 1, wherein a document is related to at least one node among a plurality of nodes of any node tree.

3. A method according to claim 1, the step (c) comprising the step of (f) when other node in the same node tree is newly designated, OR merging the documents related to all the nodes ranging from the designated node to the target node to create a collection of documents, and OR merging the now created collection of documents and the just preceding collection of the documents to create a final collection of documents.

4. A document retrieving method in a document management system which manages documents, using a computer, comprising the steps of:

(a) managing classifications of documents in accordance with a plurality of node trees having nodes linked in a hierarchical structure;

(b) managing each of the documents in relation to at least one node among a plurality of nodes in the node trees;

(c) when a particular one of the plurality of node trees is designated, searching a target node, starting from that target node and extending through lower nodes in the node tree which are linked to the target node directly or indirectly, and OR merging documents related to the reached node to create a collection of documents;

(d) when another node tree is newly designated, searching a target node in the newly designated node tree, starting from that target node and extending through lower nodes in the node tree which are linked to the target node directly or indirectly, and OR merging the documents related to the reached node to create a collection of documents; and (e) repeating the steps (c) and (d) to obtain collections of documents and performing an AND-image operation on the obtained collections to create and output a final collection of documents.

\* \* \* \* \*